United States Patent
Lim et al.

(10) Patent No.: US 11,152,638 B2
(45) Date of Patent: Oct. 19, 2021

(54) SECONDARY BATTERY

(71) Applicant: LG Chem, Ltd., Seoul (KR)

(72) Inventors: Hae Jin Lim, Daejeon (KR); Sang Uck Kim, Daejeon (KR)

(73) Assignee: LG Chem, Ltd.

(*) Notice: Subject to any disclaimer, the term of this patent is extended or adjusted under 35 U.S.C. 154(b) by 106 days.

(21) Appl. No.: 16/464,531

(22) PCT Filed: May 30, 2018

(86) PCT No.: PCT/KR2018/006172
§ 371 (c)(1),
(2) Date: May 28, 2019

(87) PCT Pub. No.: WO2018/221965
PCT Pub. Date: Dec. 6, 2018

(65) Prior Publication Data
US 2019/0348703 A1 Nov. 14, 2019

(30) Foreign Application Priority Data

Jun. 2, 2017 (KR) .................. 10-2017-0068857

(51) Int. Cl.
*H01M 50/172* (2021.01)
*H01M 10/04* (2006.01)
(Continued)

(52) U.S. Cl.
CPC ... *H01M 10/0431* (2013.01); *H01M 10/0422* (2013.01); *H01M 10/0468* (2013.01);
(Continued)

(58) Field of Classification Search
CPC ........... H01M 10/0431; H01M 50/107; H01M 50/116; H01M 50/155; H01M 50/172;
(Continued)

(56) References Cited

U.S. PATENT DOCUMENTS

| 9,299,967 B2 | 3/2016 | Kim et al. |
| 2002/0068217 A1 | 6/2002 | Watanabe et al. |

(Continued)

FOREIGN PATENT DOCUMENTS

| CN | 1356732 A | 7/2002 |
| CN | 2833901 Y | 11/2006 |

(Continued)

OTHER PUBLICATIONS

International Search Report for PCT/KR2018/006172 dated Oct. 15, 2018.
(Continued)

*Primary Examiner* — Milton I Cano
*Assistant Examiner* — Jenna Shulman
(74) *Attorney, Agent, or Firm* — Lerner, David, Littenberg, Krumholz & Mentlik, LLP

(57) ABSTRACT

The present invention relates to a secondary battery provided with a multi-tab. The secondary battery includes a jelly-roll in which an electrode and a separator are stacked to cross each other and which is wound around a central core, a plurality of multi-tab parts extending from the electrode and formed on a predetermined area at an end of the jelly-roll, a can member accommodating the jelly-roll, and an insulation member disposed adjacent to the end to insulate the can member from the jelly-roll. The insulation member includes a central hole punched in a center of the insulation member so that the central core passes therethrough and a tab hole punched around the central hole to correspond to the plurality of multi-tab parts so that the plurality of multi-tab parts pass therethrough.

8 Claims, 4 Drawing Sheets

(51) Int. Cl.
  *H01M 10/0587*  (2010.01)
  *H01M 50/107*   (2021.01)
  *H01M 50/116*   (2021.01)
  *H01M 50/155*   (2021.01)
  *H01M 50/463*   (2021.01)
  *H01M 50/538*   (2021.01)

(52) U.S. Cl.
  CPC ..... *H01M 10/0587* (2013.01); *H01M 50/107* (2021.01); *H01M 50/116* (2021.01); *H01M 50/155* (2021.01); *H01M 50/172* (2021.01); *H01M 50/463* (2021.01); *H01M 50/538* (2021.01)

(58) Field of Classification Search
  CPC ............. H01M 50/463; H01M 50/538; H01M 10/0422; H01M 10/0468; H01M 10/0587
  See application file for complete search history.

(56) References Cited

U.S. PATENT DOCUMENTS

| | | | |
|---|---|---|---|
| 2009/0208825 A1 | 8/2009 | Lee | |
| 2011/0262779 A1 | 10/2011 | Maleki et al. | |
| 2012/0009450 A1* | 1/2012 | Chun | H01M 2/023 429/94 |
| 2014/0186670 A1 | 7/2014 | Kim et al. | |
| 2014/0199571 A1 | 7/2014 | Ryu | |
| 2017/0084901 A1* | 3/2017 | Doo | H01M 2/0404 |
| 2017/0092926 A1 | 3/2017 | Doo et al. | |
| 2017/0250437 A1* | 8/2017 | Kim | H01M 10/052 |
| 2017/0346064 A1* | 11/2017 | Fukuoka | H01M 10/0431 |

FOREIGN PATENT DOCUMENTS

| | | |
|---|---|---|
| CN | 102332554 A | 1/2012 |
| CN | 103003980 A | 3/2013 |
| CN | 106549132 A | 3/2017 |
| JP | H07094165 A | 4/1995 |
| JP | 2013098102 A | 5/2013 |
| JP | 5838073 B2 | 12/2015 |
| KR | 20040092531 A | 11/2004 |
| KR | 20080017165 A | 2/2008 |
| KR | 20080047165 A | 2/2008 |
| KR | 100954590 B1 | 4/2010 |
| KR | 20110082908 A | 7/2011 |
| KR | 20140087655 A | 7/2014 |
| KR | 20140093077 A | 7/2014 |
| KR | 20160129571 A | 11/2016 |
| KR | 20170009592 A | 1/2017 |
| KR | 20170036466 A | 4/2017 |
| TW | 201301634 A | 1/2013 |
| WO | 2013002496 A2 | 1/2013 |

OTHER PUBLICATIONS

Extended European Search Report including Written Opinion for Application No. EP18810767.6 dated Jan. 14, 2020, pp. 1-12.
Search Report from Office Action for Chinese Application No. 201880007303.2 dated Jul. 22, 2021; 3 pages.

* cited by examiner

SECONDARY BATTERY

CROSS-REFERENCE TO RELATED APPLICATION

The present application is a national phase entry under 35 U.S.C. § 371 of International Patent Application No. PCT/KR2018/006172, filed on May 30, 2018, published in Korean, which claims priority from Korean Patent Application No. 10-2017-0068857, filed on Jun. 2, 2017, the disclosures of which are hereby incorporated herein by reference in their entireties.

TECHNICAL FIELD

The present invention relates to a secondary battery, and more particularly, to a secondary battery provided with a multi-tab.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

An electrode assembly and a secondary battery including the same according to the related art are disclosed in Korea Patent Publication No. 10-2008-0047165.

In the secondary battery according to the related art, since the position of the multi-tab is not constant, it is difficult to design an insulator formed between the electrode assembly and a can.

Thus, it is necessary to develop an insulator that is suitable for the multi-tab.

DISCLOSURE OF THE INVENTION

Technical Problem

The present invention has been made to solve the above problem, and thus an object of the present is to provide a secondary battery including an insulation member that is suitable for a multi-tab.

Technical Solution

A secondary battery according to an embodiment of the present invention includes a jelly-roll in which an electrode and a separator are stacked to cross each other and which is wound around a central core, a plurality of multi-tab parts extending from the electrode and extending from a predetermined area at an end of the jelly-roll, a can member accommodating the jelly-roll therein, and an insulation member disposed adjacent to the end of the jelly-roll to electrically insulate the can member from the jelly-roll, wherein the insulation member includes a central hole extending through a center of the insulation member so that the central core extends within the central hole and a tab hole extending through a periphery of the insulation member radially outside of the central hole so that the plurality of multi-tab parts extends within the tab hole.

The predetermined area may be circumferentially aligned with an area of the insulation member extending across an angle between 30° and 120° about the central core.

The tab hole may be formed in a position circumferentially aligned with the predetermined area.

The insulation member may be formed so that the central hole and the tab hole are separated from each other by a boundary part of the insulation member.

The insulation member may be formed so that the central hole and the tab hole communicate with each other.

The insulation member may have a peripheral circumference less than a peripheral circumference of the end of the jelly-roll.

The secondary battery may further include a tab part extending from the end of the jelly-roll and disposed radially outside of an outer peripheral edge of the insulation member.

The tab hole may extend radially outward to a portion of an outer peripheral edge of the insulation member.

The plurality of multi-tab parts and the tab part may be formed on the jelly-roll by welding or notching.

The end may be a lower end of the jelly-roll.

Advantageous Effects

According to the present invention, the jelly-roll including the multi-tab and the can member may be insulated from each other.

According to the present invention, the insulation member may be stably fixed between the jelly-roll including the multi-tab and the can member.

According to the present invention, the position at which the multi-tab is formed may be standardized to easily manufacture the multi-tab.

According to the present invention, the insulation member installed between the jelly-roll including the multi-tab and the can member may be minimized in size to reduce the weight of the secondary battery.

According to the present invention, the insulation member installed between the jelly-roll including the multi-tab and the can member may have the circumference less than that of the end of the jelly-roll to facilitate the additional design of the tab part.

The present invention may be applied to the multi-tab that is manufactured through various methods.

The present invention may be easily applied to the negative electrode multi-tab.

MODE FOR CARRYING OUT THE INVENTION

Figure 1:
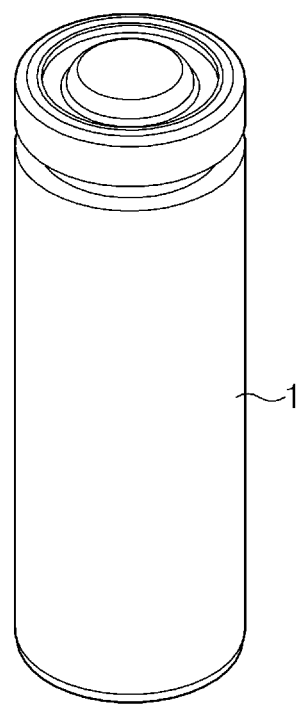
FIG. 1 is a perspective view of a secondary battery according to an embodiment of the present invention.

Hereinafter, a secondary battery according to an exemplary embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
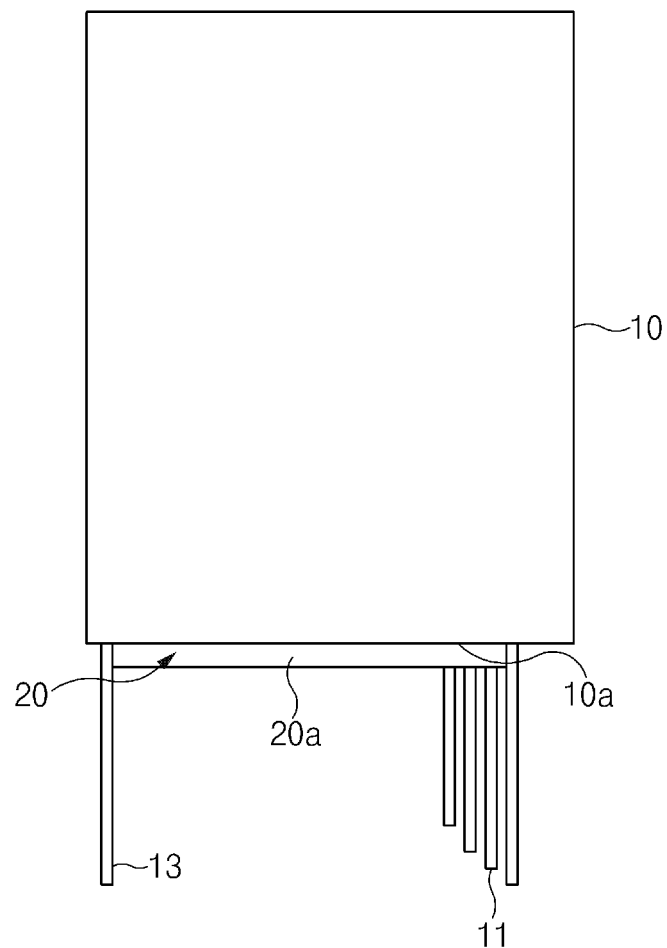
FIG. 2 is a side view illustrating only a jelly-roll and a multi-tab part of the secondary battery according to the present invention.
Figure 3:
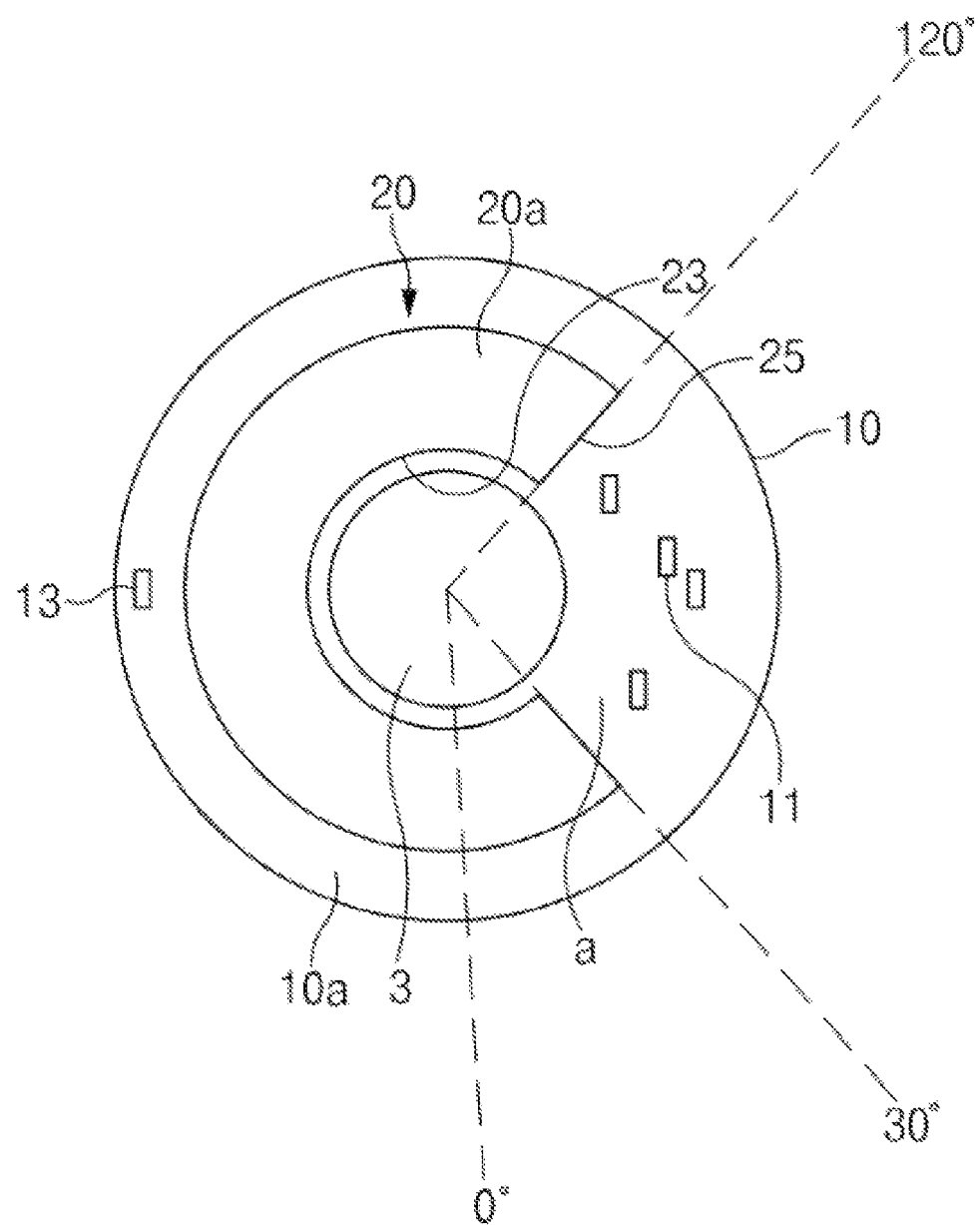
FIG. 3 is a bottom view of FIG. 2.

FIG. 1 is a perspective view of a secondary battery according to an embodiment of the present invention, FIG. 2 is a side view illustrating only a jelly-roll and a multi-tab part of the secondary battery according to the present invention, and FIG. 3 is a bottom view of FIG. 2.

As illustrated in FIGS. 1 to 3, a secondary battery according to an embodiment of the present invention includes a jelly-roll 10 in which an electrode and a separator are stacked to cross each other and which is wound around a central core 3, a plurality of multi-tab parts 11 extending from the electrode and formed on a predetermined area a at an end 10a of the jelly-roll 10, a can member 1 accommodating the jelly-roll 10, and an insulation member 20 disposed adjacent to the end 10a to insulate the can member 1 from the jelly-roll 10. The insulation member 20 has a central hole 23 punched in a center of the insulation member 20 so that the central core 3 passes therethrough and a tab hole 25 punched around the central hole 23 to correspond to the plurality of multi-tab parts 11 so that the plurality of multi-tab parts 11 pass therethrough.

The jelly-roll 10 may be manufactured by winding a stack, in which a positive electrode, a separator, and a negative electrode are stacked, in a jelly-roll shape.

The positive electrode may be an aluminum plate and include a positive electrode active material portion coated with a positive electrode active material and a positive electrode non-coating portion which is not coated with the positive electrode active material.

The negative electrode may be a copper plate and include a negative electrode active material portion coated with a negative electrode active material and a negative electrode non-coating portion which is not coated with the negative electrode active material.

The separator may be stacked between the positive electrode and the negative electrode to separate the positive electrode from the negative electrode.

As described above, the electrode according to the present invention may be at least one of the positive electrode and the negative electrode, which form the jelly-roll.

The plurality of multi-tab parts 11 and a tab part 13 may be bonded to each other by notching the non-coating portion of the electrode to extend from the electrode or by welding the plurality of multi-tab parts 11 and the tab part 13 to the non-coating portion of the electrode.

Thus, the insulation member 20 may be installed on all the jelly-roll 10 including the multi-tab parts 11 formed by the notching or welding.

The plurality of multi-tab parts 11 may be formed on the end 10a of the jelly-roll 10.

The plurality of multi-tab parts 11 may be formed on a lower end of the end 10a of the jelly-roll 10.

The plurality of multi-tab parts 11 may be negative tabs extending from the negative electrode of the electrode.

The plurality of multi-tab parts 11 may have different lengths to be electrically connected to the can member 1.

Each of the plurality of multi-tab parts 11 may have a length that gradually decreases from the end 10a of the jelly-roll 10 toward the central core 3 so as to be easily electrically connected to the can member 1.

The predetermined area "a" may correspond to an area corresponding to an angle of 30° to 120° (see FIG. 3) about the central core 3 at the end 10a of the jelly-roll 10.

As described above, the plurality of multi-tab parts 11 may be formed on the predetermined area "a" at the end 10a of the jelly-roll 10 to standardize formation positions of the plurality of multi-tab parts, thereby facilitating the manufacture.

The can member 1 may be a container made of a metal material and having a shape that is opened substantially upward in the cylindrical secondary battery. Here, iron (Fe), on which aluminum (Al) or nickel (Ni), which is light and easy to cope with corrosion, is plated may be used as the metal material.

In the insulation member 20, the central hole 23 is punched in the center, and the tab hole 25 is punched around the central hole 23.

The insulation member may have a circumferential length less than that of the end 10a of the jelly-roll 20.

Also, when the tab part 13 is formed on the circumference of the end 10a of the jelly-roll 20, the tab part 13 may extend beyond the outside of an edge of the insulation member 20. Thus, an additional tab part 13 may be easily formed on the end 10a.

The central core 3 may pass through the central hole 23. In some case, an electrode tab (not shown) formed on the end 10a of the jelly-roll 10 may pass through the central hole 23.

The tab hole 25 may be formed in a position corresponding to that of the predetermined area "a" at the end 10a of the jelly-roll 10.

That is, when the insulation member 20 is installed on the end 10a of the jelly-roll 10, the tab hole 25 may be formed in a position corresponding to the predetermined area "a" of the end 10a in the insulation member 20 to induce the multi-tab part 11 so that the multi-tab part 11 formed on the predetermined area a of the end 10a of the jelly-roll 10 easily passes through the tab hole 25.

Also, the tab hole 25 may be punched at a position corresponding to the predetermined area "a" of the end 10a in the insulation member 20 and may be opened up to a portion of the edge of the insulation member 20.

Also, the tab hole 25 may communicate with the central hole 23.

In addition, when the tab hole 25 communicating with the central hole 23 is formed in the insulation member 20, a body 20a of the insulation member 20 may be minimized to reduce a weight.

Figure 4:
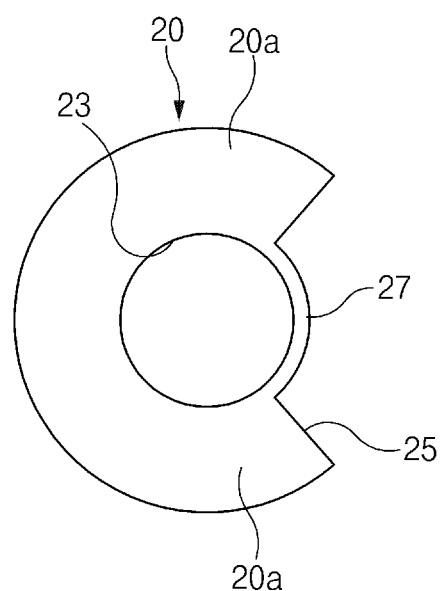
FIG. 4 is a plan view illustrating only an insulation member of a secondary battery according to another embodiment the present invention.

FIG. 4 is a plan view illustrating only an insulation member of a secondary battery according to another embodiment of the present invention.

As illustrated in FIG. 4, in a secondary battery according to another embodiment of the present invention, a central hole 23 and a tab hole 25 of an insulation member 10 are formed to be separated from each other.

To separate the central hole 23 from the tab hole 25, a boundary part 27 may be formed between the central hole 23 and the tab hole 25.

A central core 3 may be inserted into and coupled to the central hole 23 by the boundary part 27, and thus, the insulation member 10 may be guided to be fixed in a proper position at an end 10a of the jelly-roll 10, and the position of the insulation member 10 may be stably maintained without moving in a transverse direction.

As described above, according to the present invention, the jelly-roll including the multi-tab and the can member may be insulated from each other.

According to the present invention, the insulation member may be stably fixed between the jelly-roll including the multi-tab and the can member.

According to the present invention, the position at which the multi-tab is formed may be standardized to easily manufacture the multi-tab.

According to the present invention, the insulation member installed between the jelly-roll including the multi-tab and the can member may be minimized in size to reduce the weight of the secondary battery.

According to the present invention, the insulation member installed between the jelly-roll including the multi-tab and the can member may have the circumference less than that of the end of the jelly-roll to facilitate the additional design of the tab part.

The present invention may be applied to the multi-tab that is manufactured through various methods.

The present invention may be easily applied to the negative electrode multi-tab.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:
 a jelly-roll in which an electrode and a separator are stacked to cross each other and which is wound around a central core;
 a plurality of tab parts extending from the electrode and extending from a predetermined area at an end of the jelly-roll, the predetermined area located radially outside of the central hole and extending across an angle between 30° and 120° about the central core;
 a can member accommodating the jelly-roll therein; and
 an insulation member disposed adjacent to the end of the jelly-roll to electrically insulate the can member from the jelly-roll,
 wherein the insulation member comprises:
 a central hole extending through a center of the insulation member so that the central core extends within the central hole; and
 a single tab hole extending through a periphery of the insulation member radially outside of the central hole and circumferentially aligned with the predetermined area so that each of the plurality of tab parts extends within the single tab hole.

2. The secondary battery of claim 1, wherein the insulation member is formed so that the central hole and the tab hole are separated from each other by a boundary part of the insulation member.

3. The secondary battery of claim 1, wherein the insulation member is formed so that the central hole and the tab hole merge with each other to form a single continuous opening extending through the insulation member.

4. The secondary battery of claim 1, wherein the insulation member has a peripheral circumference less than a peripheral circumference of the end of the jelly-roll.

5. The secondary battery of claim 4, further comprising a tab part extending from the end of the jelly-roll and disposed radially outside of an outer peripheral edge of the insulation member.

6. The secondary battery of claim 5, wherein the plurality of tab parts and the tab part are formed on the jelly-roll by welding or notching.

7. The secondary battery of claim 1, wherein the tab hole extends radially outward to a portion of an outer peripheral edge of the insulation member.

8. The secondary battery of claim 1, wherein the end is a lower end of the jelly-roll.

* * * * *